April 30, 1940.   H. D. TAYLOR   2,199,351
DYNAMOELECTRIC MACHINE
Filed Aug. 1, 1939   2 Sheets-Sheet 1
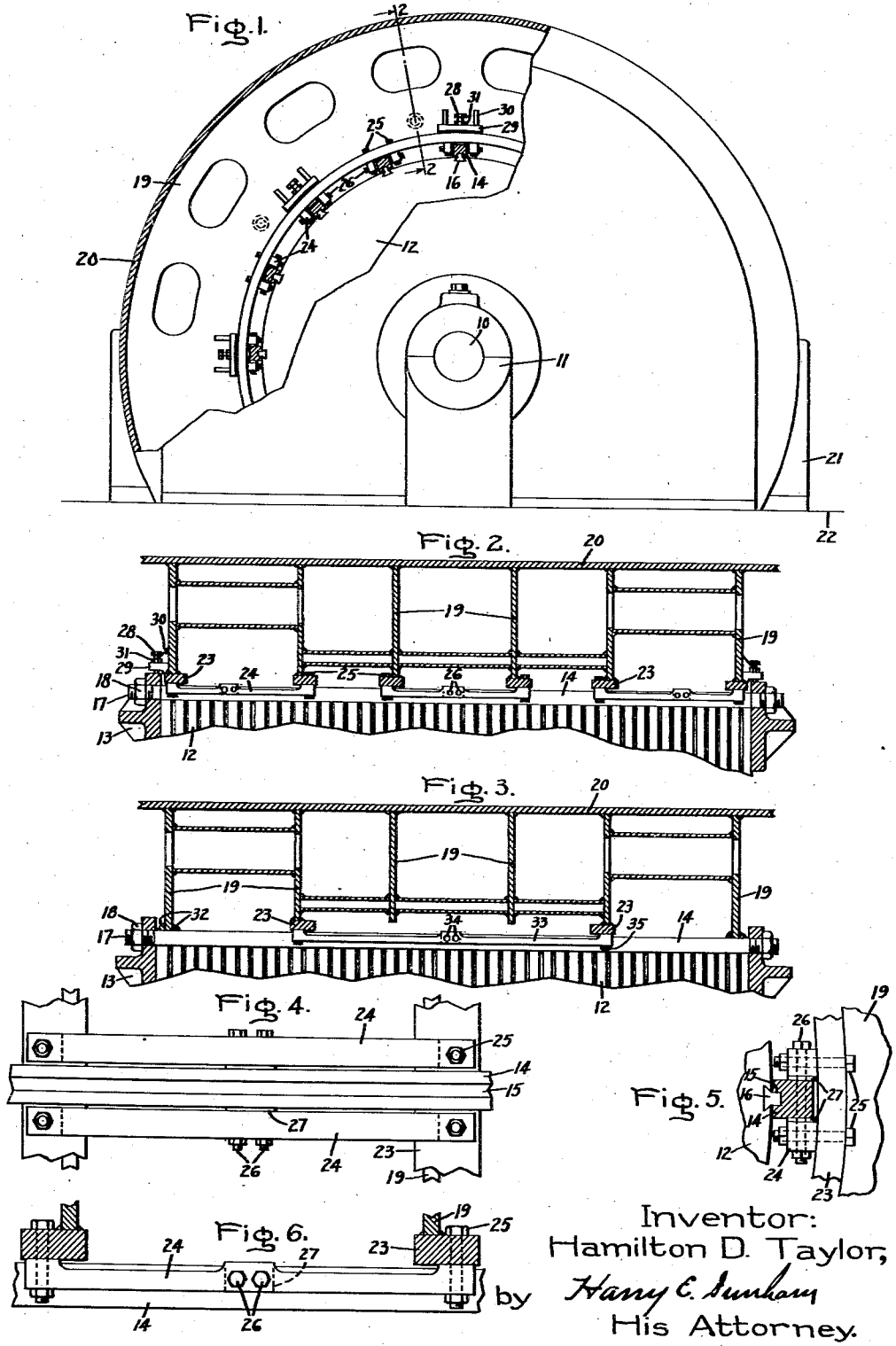
Inventor:
Hamilton D. Taylor,
by Harry E. Dunham
His Attorney.

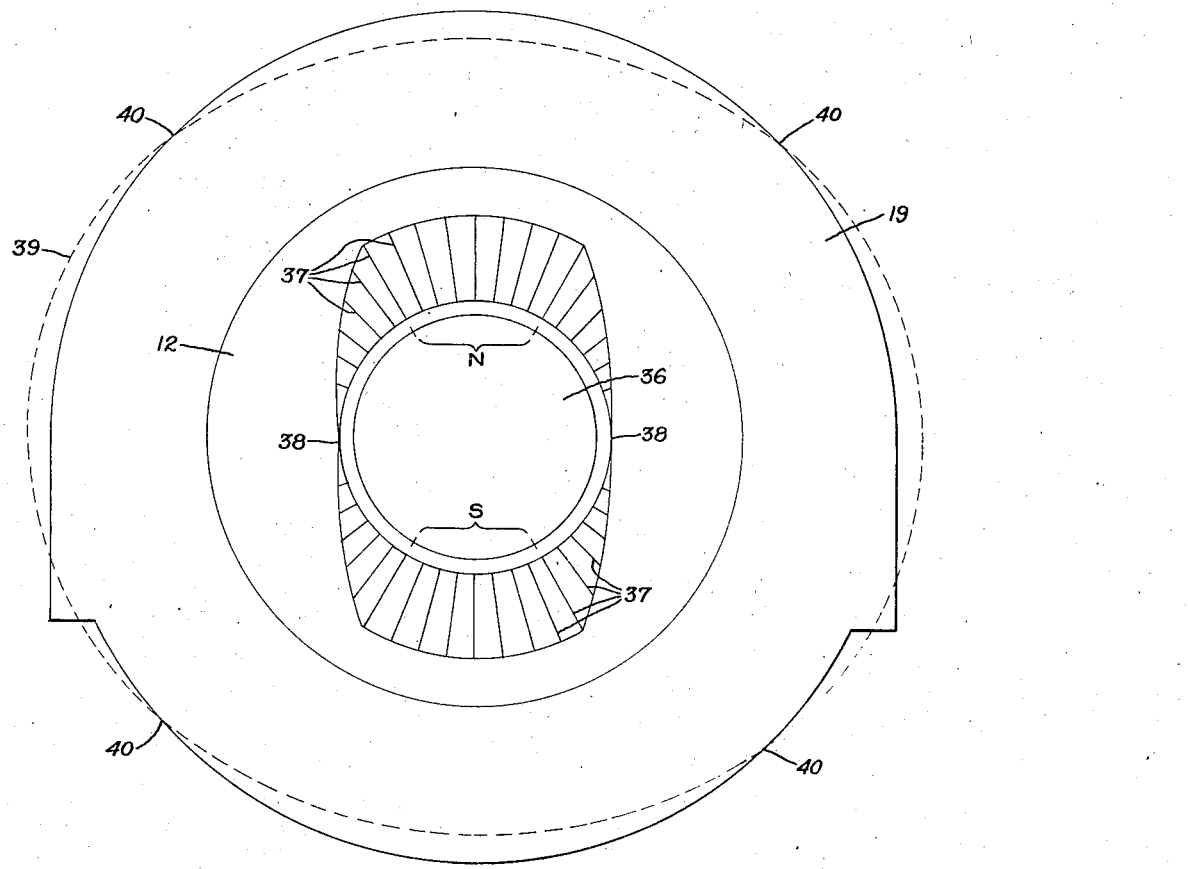

Patented Apr. 30, 1940

2,199,351

UNITED STATES PATENT OFFICE 2,199,351

DYNAMOELECTRIC MACHINE

Hamilton D. Taylor, Schenectady, N. Y., assignor to General Electric Company, a corporation of New York Application August 1, 1939, Serial No. 287,720

12 Claims. (Cl. 171—252)

My invention relates to improvements in dynamoelectric machines, and particularly to an arrangement for minimizing the effect on the support of such machines of electromagnetic distortions and vibrations produced by a rotating magnetic field in such machines.

In certain types of dynamoelectric machines, considerable vibration may be set up in the stationary member of the machine by electromagnetic distortions which are created by the rotating magnetic field set up either by the rotatable member of the machine or by currents in a stationary member winding. This is particularly noticeable in two pole machines wherein the rotatable member is excited to provide two magnetic poles which rotate within a stationary member formed of magnetic material. The magnetic attractive force of the rotor is proportional to the square of the flux density, and is always positive. This magnetic attractive force tends to pull the stator radially inwardly and to distort the stator substantially into an elliptical form, and this deformation rotates about the stationary member producing two cycles of vibration at any fixed point thereon for each revolution of the rotor. If these vibrations are transmitted through the stationary member to the supporting foundation, the foundation and other equipment supported thereby may be subjected to undesirable vibratory forces and noise. The stationary member of such a machine usually is provided with a laminated core in which the armature winding is arranged, and this assembly is mounted within a stationary supporting frame. It generally has been accepted that if the stiffness of the stationary member can be increased, the distortion thereof due to the rotating magnetic field may be reduced correspondingly. It has been found, however, that the rigid connection between the laminated core and the supporting frame does not provide an element having a deep beam stiffness, but rather the effect of a combination of two beams, one above the other, so that the resultant stiffness is merely the sum of the stiffness of the two elements. By actual tests, it has been found that the stiffness of a conventional laminated core in this type machine may be seven or more times that of a supporting frame, and therefore, the stiffening of the frame adds relatively little to the resultant stiffness of the stationary member of the machine.

In order to minimize the transmission of vibrations which are produced by the deformation of the laminated core of a stationary member in this type of machine, a plurality of flexible beam springs is arranged for flexibly supporting the core upon the stationary supporting frame. This is not my invention, but is the invention of Lloyd P. Grobel, and is disclosed and claimed in his copending application, Serial No. 287,735, filed August 1, 1939, and assigned to the same assignee as this application. These supporting springs are arranged to allow only relatively small deflections of the core due to the weight thereof, and also should avoid torsional resonance with any pulsating torques which may occur due to short circuits or operation with unbalanced phase loads. It has been found that with two pole machines of this type, the stationary core vibrates with a four-node vibration which is not entirely radial, but that the instantaneous nodal points on the outer periphery of the core have tangential displacements equal to about one-half or less of the maximum radial displacements thereof. By supporting the laminated core within the stationary supporting frame on a flexible support which provides both radial and tangential flexibility, very little vibration will be transmitted to the stationary supporting frame, so that the transmission of magneic vibratory forces to the foundation of the machine and noises incident thereto is substantially eliminated.

An object of my invention is to provide a dynamoelectric machine having an improved arrangement for supporting a stator core within a stator frame.

Another object of my invention is to provide an improved flexible support for a magnetic core subjected to vibratory forces to minimize the transmission of such forces between the core and its supporting frame.

Further objects and advantages of my invention will become apparent and my invention will be better understood from the following description referring to the accompanying drawings, and the features of novelty which characterize my invention will be pointed out with particularity in the claims annexed to and forming part of this specification.

In the drawings, Fig. 1 is an end view, partially broken away, of a dynamoelectric machine provided with an embodiment of my improved stationary member and supporting arrangement; Fig. 2 is a partial sectional view taken along line 2—2 of Fig. 1; Fig. 3 is a partial sectional elevational view of a modification of the arrangement shown in Figs. 1 and 2; Fig. 4 is a fragmentary view showing the relative arrangement of my improved supporting springs and their connection to the frame and core of the stationary member; Fig. 5 is a fragmentary enlarged end view of my improved flexible supporting elements and their connection to the frame and core as shown in Figs. 1 and 2; Fig. 6 is a fragmentary side elevational view of the elements illustrated in Fig. 4; and Fig. 7 is an instantaneous force diagram of a four node vibration on a frame of a machine of the type shown in Fig. 1.

Referring to the drawings, I have shown my invention in connection with a dynamoelectric machine having a rotatable member supported by a shaft 10. The rotatable member shaft is supported by pedestal bearings mounted in bearing housings 11 arranged at each end of the machine. The rotatable member is provided with a magnetic core and an exciting winding, and is arranged to react electrodynamically with the stationary member, which is provided with an armature winding supported in a laminated core of magnetic material mounted in a stationary supporting frame. The laminated core includes a plurality of laminations 12 which is secured in assembled relation between end plates 13 at each end thereof and drawn together by a plurality of clamping bars 14. A plurality of these bars is arranged in circumferentially spaced apart relation about the periphery of the laminated core, and each bar is formed with a groove 15 into which is secured a dovetail key 16 which also is fitted into a dovetail groove in the outer edge of the laminations 12. The outer ends 17 of the clamping bars 14 are threaded and extend through openings formed in the end plates 13. The stiffness of the magnetic core depends upon the pressure with which the laminations are clamped together. This pressure should be such that no substantial displacement occurs between adjacent laminations due to the electromagnetic distortion of the core in order to prevent chafing of the insulation on the armature winding arranged in the slots of this core. The clamping pressure between the two end plates 13 may be varied by adjusting nuts 18 which engage the threaded ends 17 of the clamping bars 14. The stationary supporting frame includes a plurality of annular supporting and stiffening plates 19 arranged in longitudinally spaced apart relation and secured within an outer wrapper plate 20. This supporting frame is provided with feet 21 on each side thereof, which are mounted upon a supporting foundation 22. To provide a flexible support which is substantially rigid longitudinally of the stationary member, I provide a ring 23 welded to the inner edge of each of the plates 19 and a plurality of beam springs 24 arranged in longitudinally spaced apart sets and circumferentially spaced apart relation about the laminated core in each of these sets. These beam springs 24 are arranged in pairs, one on each side of a bar 14 and are formed with an enlarged portion adjacent each end and adjacent the central portion thereof. These beam springs 24 are secured adjacent the ends thereof to the supporting rings 23 by bolts 25 which extend through the enlarged ends, and are secured adjacent the central portion thereof to the bars 14 by bolts 26, which extend through the enlarged central portion of the springs and through the clamping bars 14. A spacing block 27 is arranged between each of the springs 24 and the adjacent clamping bar 14 to provide a slight clearance between the spring and the bar to allow for slight tangential flexing of the springs 24 without resulting in contact between the springs and the bars 14. In order to provide the desired radial and tangential flexibility to the supporting arrangement, the beam springs 24 are constructed so that their flexibility is substantially greater in a radial direction than in a tangential or circumferential direction with respect to the laminated core. This is obtained by making the springs 24 substantially twice as wide in a tangential direction as they are deep in a radial direction, as can readily be seen from Figs. 4 and 6. The relative flexibility of the spring supporting arrangement in the tangential and radial directions is not my invention, but is the invention of Chester W. Brice, and forms the subject of his copending application Serial No. 287,767, filed August 1, 1939, and assigned to the same assignee as this application. This arrangement of flexible springs provides a support for the laminated core which is substantially rigid longitudinally thereof and flexible radially and tangentially thereof, with the radial flexibility substantially greater than the tangential flexibility of the support. Furthermore, it allows for slight tangential and radial displacements of the laminated core within the stationary supporting arrangement, so that very little vibration is transmitted to the supporting frame and foundation 22.

It has been found that the deformation of the core of such a machine is substantially greater adjacent the central portion thereof than at the ends thereof, and in certain instances, the displacement at the ends of the core is negligibly small. It, therefore, is not necessary in all instances to support flexibly the outer ends of the laminated core. In order to provide a rigid support between the core and the frame adjacent the ends thereof, adjustable stop or limit screws 28 threadedly engage openings in stop plates 29 which are rigidly welded to the other side of the outer stiffening plates 19 adjacent the inner edge thereof. Gusset plates 30 are welded to the stop plates 29 and to the outer surface of the outer stiffening plates 19 to provide a more rigid connection between the stops 29 and the plates 20. A plurality of these limit screws 28 and stop plates 29 is arranged in circumferentially spaced apart relation about the inner edge of each of the outer stiffening plates 19. The limit screws 28 are adjusted in relation to the stop plates 29 and the outer edge of the end plates 13 so as to provide a rigid support for the end plates 13 and the laminated core 12 on the outer stiffening plates 19. A lock nut 31 threadedly engages each limit screw 28 to insure against accidental loosening after it has been adjusted to provide the desired rigid support for the end plate 13. In this manner, the outer ends of the laminated core of the stationary member of the dynamoelectric machine are rigidly supported upon the frame of the stationary member and the beam springs 24 flexibly support the remainder of the core on the stationary member supporting frame.

Fig. 3 shows another arrangement for providing this latter type of flexible support of the central portion of a laminated core and a rigid support of the outer ends thereof. In this arrangement, the outer ends of each of the clamping bars 14 are welded at 32 to the inner edge of the outer supporting plates 19. In this manner, the outer ends of the laminated core are rigidly supported upon the outer supporting frame. A plurality of circumferentially spaced apart beam springs 33 is arranged about the laminated core 12 adjacent the central portion thereof. These springs are arranged in pairs, one on each side of a bar 14, and are secured adjacent the central portion thereof by bolts 34 to the bars 14. The springs 33 are secured adjacent the outer ends thereof by bolts 35 to the supporting rings 23, as in the arrangement shown in Figs. 1, 2, 4, 5 and 6. The two inner stiffening plates 19 are made of a slightly smaller radial depth, so as to provide clearance between these plates and the core to allow for slight radial deflections of the core without interference between the plates and the clamping bars 14. The general construction of the beam springs 33 is the same as that of the springs 24 which has been explained with respect to the other figures of the drawings. Thus, the outer ends of the laminated core 12 of the stationary member of the dynamoelectric machine are rigidly supported upon the frame of the stationary member, and the beam springs 33 flexibly support the intermediate portion of the core on the stationary member supporting frame.

In this general type of flexible core support, the frame is free to vibrate at its own resonant frequency, and this tendency to vibrate may be stimulated by the vibratory forces transmitted thereto through the flexible supports. It therefore becomes of importance that the frame shall not amplify the transmitted vibrations, and shall not have a resonant characteristic near that of the normal operating vibration of the core. It also is desirable that the frame resonant or natural frequency should be higher than the transmitted normal operating vibration of the core, so that this frequency will not be passed as the machine accelerates to or decelerates from normal operating speed. In order to insure against disturbing vibrations and noises the natural frequency of the frame for four node vibrations should be substantially different, that is, about twenty or twenty-five per cent or more different from twice normal operating speed of the rotor of the machine. Fig. 7 illustrates the forces imposed upon a stator by a two pole rotor 36 rotating within the stator. If the rotor field is excited to produce two poles N and S, the magnetic attractive force of these poles upon the core 12 is represented by the length of the lines 37. This force is a maximum over the pole faces and decreases to zero at a neutral position substantially midway between the faces as shown at 38. If the stator frame 19 and core 12 are rigidly secured together, the frame will tend to distort into a form as indicated by the dotted line 39 with those portions nearer the pole faces drawn inwardly toward the pole faces and those portions intermediate the two pole faces forced outwardly from the normal circumference thereof. As shown in Fig. 7, there are four nodes or neutral points 40 on the circumference of the stator which do not tend to move inwardly or outwardly. These points are determined by the intersection of the normal circumference by the distorted circumference of the stator. Higher modes of vibration having more than four nodes may occur, but the resultant amplitude of distortion generally is so small as not to be objectionable. Thus it is particularly important that the four node natural period of vibration of the frame shall be materially different from and preferably higher than twice the operating speed of the machine.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine having a rotatable member and a stationary member, said stationary member being provided with a frame and a core arranged within said frame, means flexible radially of said core for supporting said core in said frame, and means adjacent an end of said core for rigidly supporting said end of said core in said frame.

2. A dynamoelectric machine having a rotatable member and a stationary member, said stationary member being provided with a frame and a core arranged within said frame, means flexible radially and tangentially of said core for supporting said core in said frame substantially rigidly longitudinally thereof, and means adjacent an end of said core for rigidly supporting said end of said core in said frame.

3. A dynamoelectric machine having a rotatable member and a stationary member, said stationary member being provided with a frame and a core arranged within said frame, means including beam springs arranged at circumferentially spaced apart points for supporting said core in said frame, said beam spring means being flexible radially of said core, and means for rigidly supporting said core in said frame adjacent an end thereof.

4. A dynamoelectric machine having a rotatable member and a stationary member, said stationary member including a frame having a four node natural period of vibration substantially different from twice the normal operating speed of said rotatable member, a core arranged within said frame, and means for flexibly supporting said core in said frame and providing a substantially rigid support longitudinally thereof.

5. A dynamoelectric machine having a rotatable member and a stationary member, said stationary member including a frame having a four node natural period of vibration substantially different from twice the normal operating speed of said rotatable member, a core arranged within said frame, means flexible radially of said core for supporting said core in said frame, and means adjacent an end of said core for rigidly supporting said end of said core in said frame.

6. A dynamoelectric machine having a rotatable member and a stationary member, said stationary member including a frame having a four node natural period of vibration substantially different from twice the normal operating speed of said rotatable member, a core arranged within said frame, means for flexibly supporting said core in said frame, and means adjacent the ends of said core for rigidly supporting said ends of said core in said frame.

7. A dynamoelectric machine having a rotatable member and a stationary member, said stationary member including a frame having a four node natural period of vibration substantially higher than twice the normal operating speed of said rotatable member, a core arranged within said frame, means for flexibly supporting the central portion of said core in said frame, and means adjacent the ends of said core for rigidly supporting said ends of said core in said frame.

8. A dynamoelectric machine having a rotatable member and a stationary member, said stationary member being provided with a frame, a laminated core arranged within said frame, means for securing and retaining said laminated core in assembled relation, means including a plurality of circumferentially spaced apart beam springs secured to said frame and to said core assembly retaining means for supporting said core in said frame, and means for rigidly securing said core to said frame adjacent an end thereof.

9. A dynamoelectric machine having a rotatable member and a stationary member, said stationary member being provided with a frame, a laminated core arranged within said frame, means for securing and retaining said laminated core in assembled relation, means including a plurality of beam springs secured to said frame and to said core assembly retaining means for supporting said core in said frame, said beam springs being arranged in circumferentially spaced apart relation intermediate the ends of said core, and means for rigidly securing said core to said frame adjacent the ends thereof.

10. A dynamoelectric machine having a rotatable member and a stationary member, said stationary member being provided with a frame element, a laminated core element arranged within said frame element, means for securing and retaining said laminated core element in assembled relation, and means including a plurality of beam springs secured adjacent the ends thereof to one of said elements and secured intermediate the ends thereof to the other of said elements for supporting said core element in said frame element.

11. A dynamoelectric machine having a rotatable member and a stationary member, said stationary member being provided with a frame element, a laminated core element arranged within said frame element, means for securing and retaining said laminated core element in assembled relation, means including a plurality of beam springs secured adjacent the ends thereof to one of said elements and secured intermediate the ends thereof to the other of said elements for supporting said core element in said frame element, said beam springs being arranged in circumferentially spaced apart relation intermediate the ends of said core, and means for rigidly securing said core assembly retaining means to said frame element adjacent the ends thereof.

12. A dynamoelectric machine having a rotatable member and a stationary member, said stationary member including a frame having a four node natural period of vibration substantially higher than twice the normal operating speed of said rotatable member, a core arranged within said frame, and means for flexibly supporting said core in said frame and providing a substantially rigid support longitudinally thereof.

HAMILTON D. TAYLOR.

DISCLAIMER 2,199,351.—*Hamilton D. Taylor*, Schenectady, N. Y. DYNAMOELECTRIC MACHINE. Patent dated April 30, 1940. Disclaimer filed December 6, 1940, by the assignee, *General Electric Company*.

Hereby enters this disclaimer of claim 10 of said patent.

[*Official Gazette January 7, 1941.*]